July 18, 1944.     F. A. WEBER     2,353,862
COMBINED BRANCH VALVE AND DRAIN VALVE
Filed April 14, 1944     2 Sheets-Sheet 1
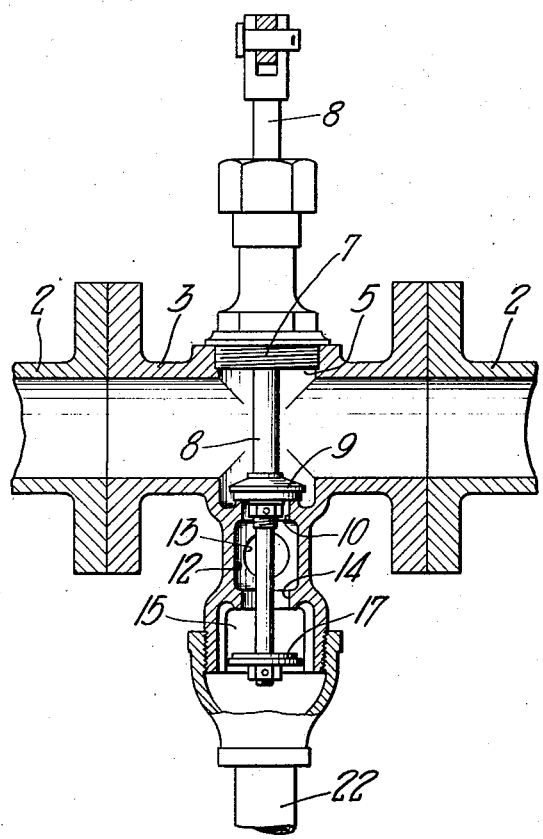
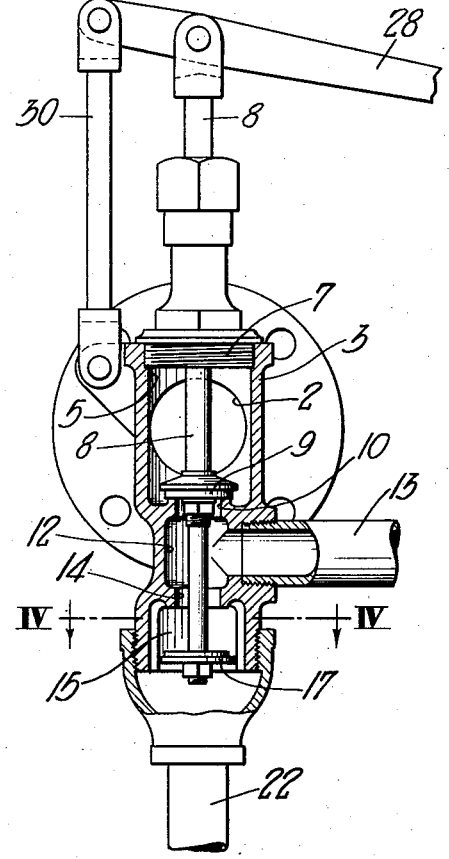
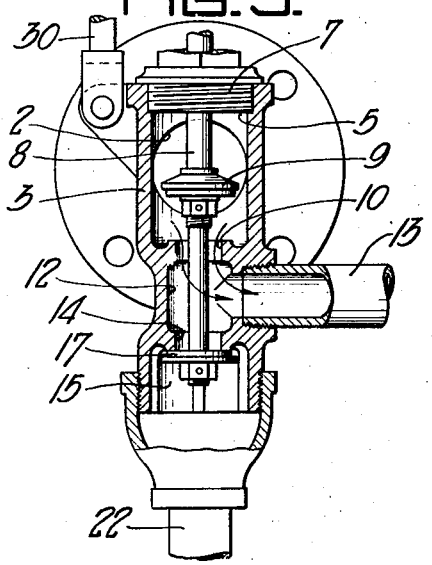
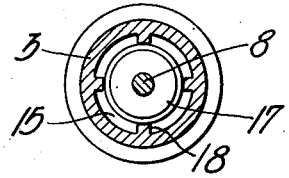
Inventor:
FRED A. WEBER,
by: John E. Jackson
his Attorney.

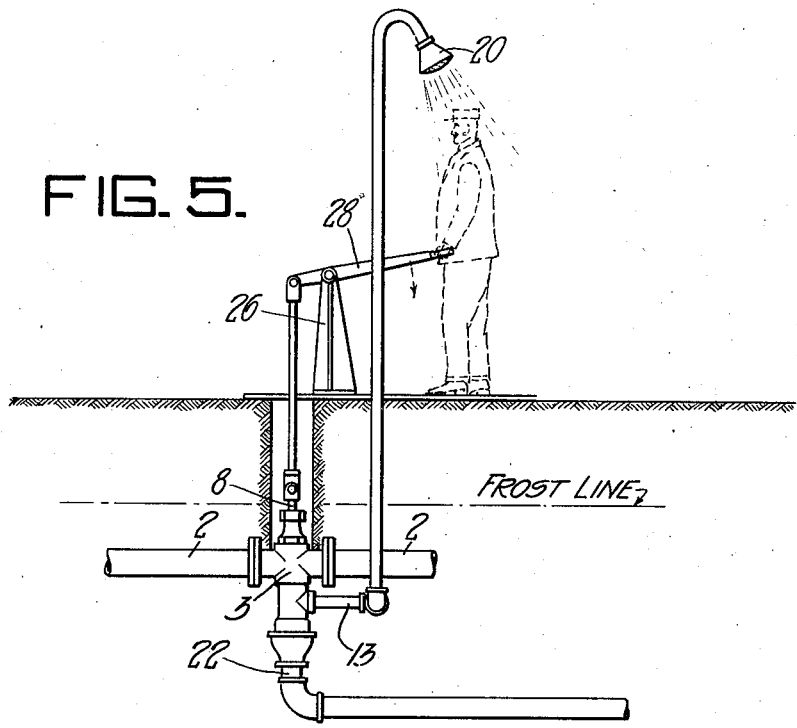
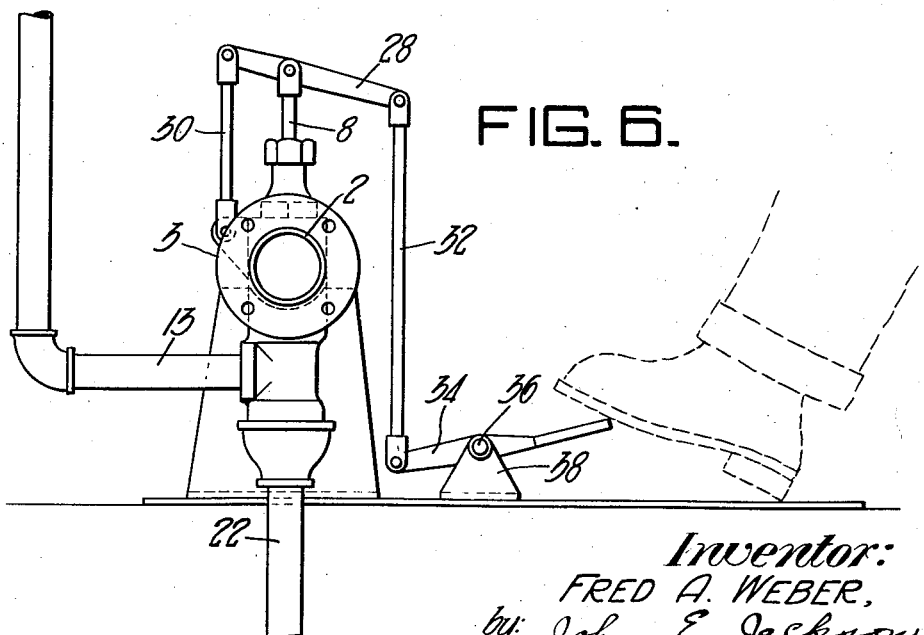

Patented July 18, 1944

2,353,862

UNITED STATES PATENT OFFICE 2,353,862

COMBINED BRANCH VALVE AND DRAIN VALVE

Fred A. Weber, Gary, Ind.

Application April 14, 1944, Serial No. 531,060

3 Claims. (Cl. 137—69)

This invention relates to valve devices, and more particularly to a combined branch valve and drain valve wherein there is provided means for diverting part of the flow of fluid from a supply conduit, together with a drain valve for the diverted flow. This is a continuation-in-part of my copending application, Serial No. 412,671, filed September 27, 1941.

In numerous commercial installations, there is employed a fluid supply conduit having numerous branch lines through which it is desired to divert part of the flow therefrom. After communication with the supply conduit is cut off, the fluid remaining in the branch lines frequently gives trouble because of freezing or overheating.

In the use of ordinary valves where the outlet from the supply conduit is at a higher elevation than the opposite end of the branch line, the contents of the branch line remain trapped between the control valve and the outlet of the branch line when the control valve is shut off. In case the branch line is exposed to intense cold, the pipe will freeze and perhaps burst, curtailing operation. If, on the other hand, this branch line is exposed to high temperatures, dangerous pressures might build up, or the temperature of the branch line become so high that it becomes a menace to safety, and this is particularly true when the fluid being transported is oil or water.

In certain of the installations mentioned above, the branch line is used infrequently for emergency purposes and the danger of freezing is therefore more acute. For example, the valve has been used successfully to supply water to emergency showers on the top of a battery of coke ovens. Occasionally the clothing of men working on top of the battery catches on fire and they jump under the nearest shower to extinguish the flame. If the valve or branch line is frozen the shower will not operate and the workmen may be seriously or even fatally burned. The valve may also be used on emergency showers for the protection of workmen at acid unloading docks, in acid plants and in other places where the workmen are exposed to the danger of fire or acid.

It is among the objects of the present invention to provide a combined branch valve and drain valve wherein fluid trapped between the branch valve and the outlet of the branch line is automatically drained.

Another object is the provision of a device of the class described which is easy and inexpensive to manufacture, install and maintain.

The invention, then, comprises the features hereinafter fully described and as particularly pointed out in the claims, the following description and the annexed drawings setting forth in detail a certain illustrative embodiment of the invention, this being indicative of one of the number of ways in which the principles of the invention may be employed.

In the drawings:

Figure 1 is an elevational view, partly in section;

Figure 2 is a view similar to Figure 1 but taken at right angles with respect thereto.

Figure 3 is a fragmentary view of a part of the showing of Figure 2 but illustrating some of the elements in other operating positions.

Figure 4 is a sectional view on the line IV—IV of Figure 2.

Figure 5 is an elevation showing the valve installed on an emergency shower; and Figure 6 is a similar view showing another installation of the valve.

Referring more particularly to the drawings, the numeral 2 designates a supply conduit through which a fluid is permitted to flow. Disposed within the supply conduit 2 is a valve body generally designated at 3. At its top the valve body 3 has a port 5 in which there is screw-threadedly secured a plug 7 having extending therethrough a valve stem 8. This valve stem 8 intersects the central passageway of the valve body 3 and has secured thereto a valve 9 which will hereinafter be referred to as the control valve. This control valve 9, when in closed position, remains below the central passageway through the valve body 3, and when in such position, seals a valve port 10 in the bottom of the valve body 3. This valve port 10 communicates with a passage 12 which in turn communicates with a right-angularly extending branch line 13. The lower end of the valve stem 8 projects beyond the valve 9, extends through the passage 12 and also a valve port 14 which communicates with a drain passage 15. Within the drain passage 15 and connected to the lowermost end of the valve stem 8 is a valve 17 which seals the valve port 14 in the lower end of the passage 12. Guide ribs 18 in the passage 15 center the valve 17 to guide the lower end of the valve stem.

As shown in Figure 5, the valve 3 is installed in the water main 2 below the frost line and the branch conduit 13 leads to a shower head 20 which is located above the ground. To the drain passage 15 is connected a drain pipe 22 which leads to a sewer or other outlet. The valve stem 8 extends upwardly above the ground line to a point adjacent the shower 20 with its upper end connected to a lever 24 which is pivotally mounted on a bracket 26.

The operations of the device are as follows:

The normal position of the valve is that shown in Figure 1, in which the water flows through the supply conduit 2 in either direction. The line pressure acting upon the top of valve 9 holds the valve in this closed position and positive upward pull on the stem 8 is necessary to open the valve.

When an emergency occurs, the workman rushes under the shower, grabs the free end of the lever 24, and shoves it down, this raising the valve stem 8 and valves 9 and 17 against the pressure in the line to the position shown in Figure 3 in which the water flows from the main conduit 2 into passage 13 and thence to the shower 20. Valve 17 in the drain passage 15 assumes its uppermost position to close the valve port 14 in the bottom of passage 12, this preventing the flow of water to the drain. When sufficient water has been showered on the workman, he releases the lever 24 and the pressure of the water automatically forces the valve 17 open and pulls the valve stem downward to close the valve 9. Line pressure on valve 9 also acts in the same direction to close it and hold it in closed position. This stops the flow of water to the branch passage 13 and opens the drain passage 15 to the drain connection 22. With the drain valve open, the branch line is vented at both ends to insure complete drainage of the line so that there will be no danger of water remaining in the branch line and freezing which would make the shower inoperable.

As shown in Figure 6, the top of the valve stem 8 is connected to a lever 28 which is pivotally connected to the arm 30 attached to the valve body 3. The other end of the lever 28 is connected to a rod 32 which extends downwardly and is pivotally connected to the foot pedal 34 which is connected by means of the pin 36 to the bracket 38. When it is desired to supply water or other fluid to the branch line 13, the operator steps on the foot pedal 34 to raise the valve stem and its associated valves against the pressure of the line. The operation is otherwise as disclosed above. It will be understood that the valve stem 8 may be raised by means other than that disclosed, such as by means of a solenoid.

While two specific embodiments of the invention have been shown and described, it will be apparent that other adaptations and modifications may be made without departing from the scope of the following claims.

I claim:

1. A fluid supply device comprising a substantially horizontal fluid supply conduit, a substantially vertical branch passage communicating with said fluid supply conduit, said branch passage having a pair of spaced concentric substantially horizontally disposed valve seats, the upper seat facing the pressure side of the branch passage and the lower seat facing away from the pressure side, a substantially vertical, rigid valve stem disposed to extend through said spaced concentric valve seats, a pair of spaced concentric valves carried by said valve stem for movement therewith, a substantially horizontal branch line communicating with said branch passage at a position intermediate said spaced concentric valve seats, and a drain line forming an extension of the lower end of said branch passage, said valves being so spaced with respect to said valve seats as to alternately occupy open and closed positions, whereby the upper of said valves may operate to control communication of said branch line with said fluid supply conduit and the lower of said valves may serve to control communication of said branch line and branch passage with said drain line, the drain line being so constructed and arranged that the fluid upon closing of the upper valve will be drained from the branch line and the lower part of the branch passage, the pressure on the top of the upper valve being greater than the pressure on the lower valve whereby the upper valve is normally held in its closed position.

2. A fluid supply device comprising a substantially horizontal fluid supply conduit, a substantially vertical branch passage communicating with said fluid supply conduit, said branch passage having a pair of spaced concentric substantially horizontally disposed valve seats, the upper seat facing the pressure side of the branch passage and the lower seat facing away from the pressure side, a substantially vertical, rigid valve stem disposed to extend through said spaced concentric valve seats, a pair of spaced concentric valves carried by said valve stem for movement therewith, a substantially horizontal branch line communicating with said branch passage at a position intermediate said spaced concentric valve seats, and a drain line forming an extension of the lower end of said branch passage, said valves being so spaced with respect to said valve seats as to alternately occupy open and closed positions, whereby the upper of said valves may operate to control communication of said branch line with said fluid supply conduit and the lower of said valves may serve to control communication of said branch line and branch passage with said drain line, the drain line being so constructed and arranged that the fluid upon closing of the upper valve will be drained from the branch line and the lower part of the branch passage, the pressure in said fluid supply conduit normally holding the upper valve closed, and means for positively raising the valve stem to open the upper valve and to close the lower valve.

3. A fluid supply device comprising a substantially horizontal fluid supply conduit, a substantially vertical branch passage communicating with said fluid supply conduit, said branch passage having a pair of spaced concentric substantially horizontally disposed valve seats, the upper seat facing the pressure side of the branch passage and the lower seat facing away from the pressure side, a substantially vertical, rigid valve stem disposed to extend through said spaced concentric valve seats, a pair of spaced concentric valves carried by said valve stem for movement therewith, a substantially horizontal branch line communicating with said branch passage at a position intermediate said spaced concentric valve seats, and a drain line forming an extension of the lower end of said branch passage, said valves being so spaced with respect to said valve seats as to alternately occupy open and closed positions, whereby the upper of said valves may operate to control communication of said branch line with said fluid supply conduit and the lower of said valves may serve to control communication of said branch line and branch passage with said drain line, the drain line being so constructed and arranged that the fluid upon closing of the upper valve will be drained from the branch line and the lower part of the branch passage, said upper valve normally being closed, and means for positively raising the valve stem to open the upper valve and to close the lower valve, the pressure in said supply conduit closing said upper valve when the last said means are rendered inoperative.

FRED A. WEBER.